Aug. 18, 1925.　　　　　　　　　　　　　　1,550,591
E. G. STONE
ROTARY KILN
Filed March 21, 1922　　　3 Sheets-Sheet 2
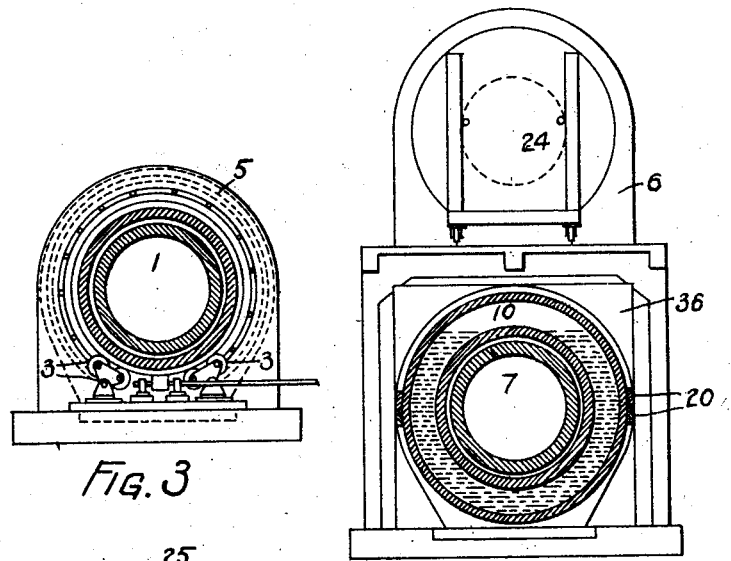
Fig. 3
Fig. 4
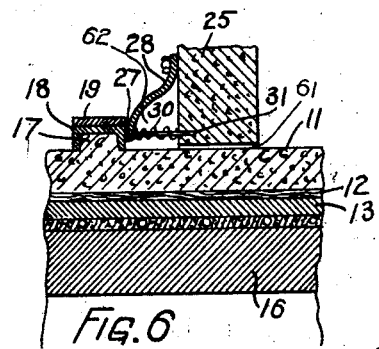
Fig. 6
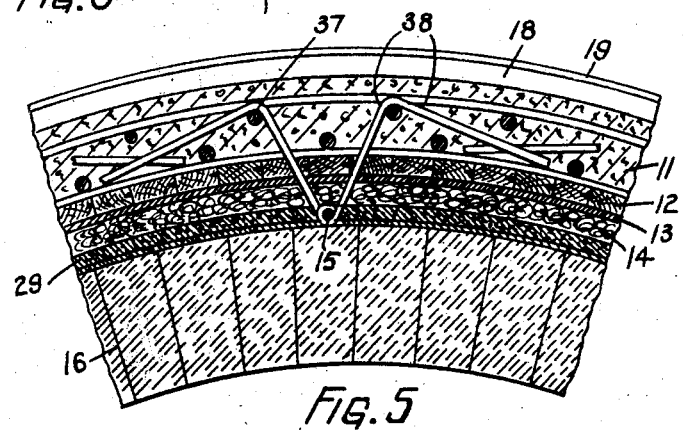
Fig. 5
Edward Giles Stone,
INVENTOR;
By
his Attorney.

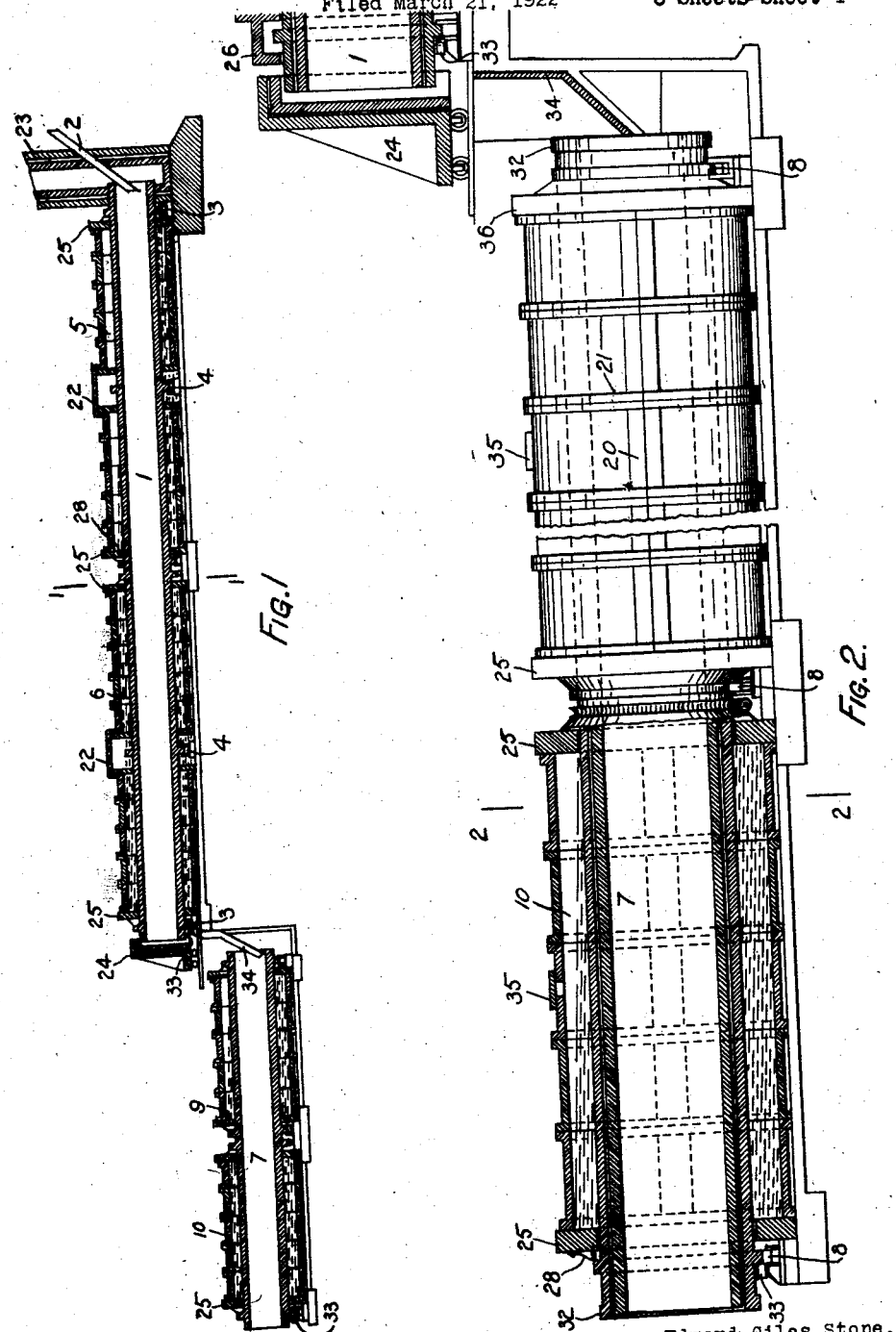

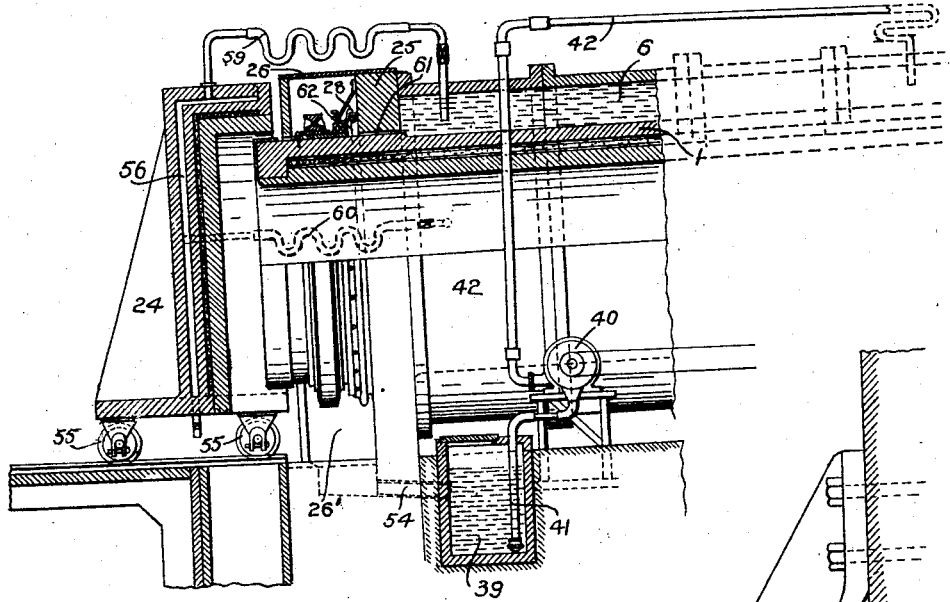
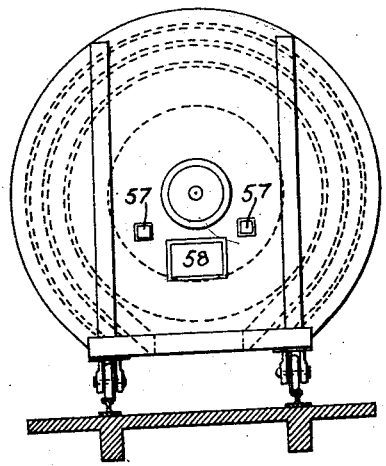
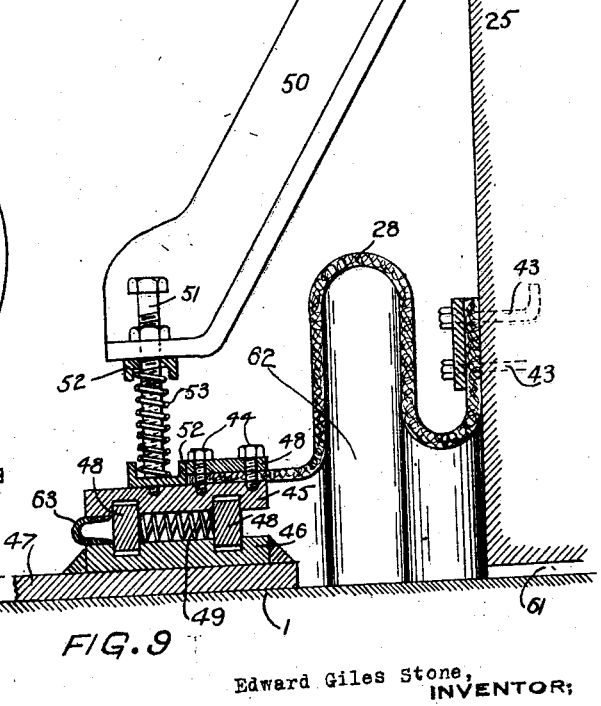

Patented Aug. 18, 1925.

1,550,591

UNITED STATES PATENT OFFICE.

EDWARD G. STONE, OF HOBART, TASMANIA, AUSTRALIA.

ROTARY KILN.

Application filed March 21, 1922. Serial No. 545,415.

*To all whom it may concern:*

Be it known that I, EDWARD GILES STONE, a subject of the King of Great Britain and Ireland, residing at Collins Street, Hobart, in the State of Tasmania, Commonwealth of Australia, have invented certain new and useful Improvements in a Rotary Kiln, of which the following is a specification.

This invention relates to rotary tubular machinery such as rotary kilns, rotary furnaces, ball mills, tube mills and other similar machinery which is usable for calcining, pulverizing, grinding, drying, or similarly treating materials of various kinds.

The object of the invention is to provide means whereby in the operation of the machinery an appreciable reduction of the friction incidental to the running thereof is effected. Such machinery as at present constructed requires to be driven by powerful prime movers. The initial cost of the latter and the rotary tubular machinery combined therewith, and the cost of working and maintaining same are considerably reduced by this invention. Further, a higher standard of efficiency is secured in the operation of a plant constructed and arranged in accordance with the invention.

Rotary tubular machinery to which this invention relates has under known modes of construction been found rather cumbersome and unwieldy to operate owing mainly to the great absorption of power in the driving thereof, the latter being due to a high degree of frictional resistance to the rotation of the tubular machinery at the bearing surfaces thereof which are in contact with the supporting devices arranged to take the weight of the machinery.

To provide for a reduction of the frictional resistance mentioned a chamber or chambers which are approximately watertight are furnished in connection with the rotary elements of the machinery, whereby a condition of buoyancy is provided for such elements in their rotation sufficient to considerably reduce the frictional resistance thereof on their rigid supports or bearings.

One embodiment of the invention in relation to a rotary kiln for the manufacture of cement is shown in the accompanying drawings, in which Fig. 1 is a longitudinal section of the rotary kiln and cooler; Fig. 2 a longitudinal sectional elevation of the cooler and means for discharging the clinker from the kiln and for feeding it to the cooler; Fig. 3 a cross section of the kiln on line 1—1 Fig. 1; Fig. 4 a cross section of the cooler on line 2—2 Fig. 2; Figs. 5 and 6 detail sectional views illustrating the construction of the kiln and cooler; Figure 7 is a detail view illustrating the construction of a water cooled hood and means for returning water to the water carrying chambers; Figure 8 is a front elevational view of the water cooled hood; and Figure 9 is a detail view of one construction of means for regulating egress of water from the water carrying chambers.

Referring to the drawings, the raw materials to be treated are fed to the rotary calcining zone 1 of the kiln by a chute or the like 2 and are gradually carried by the inclination and rotation of the zone 1 to the discharge end of the kiln. The kiln is arranged with a slope from the feed to the discharge end thereof. Suitable bearings are provided for the rotary element 1 at either end and at intermediate portions thereof, the number of such bearings being dependent on the length of the said rotary element. These bearings may consist of rollers 3 disposed at both ends of the kiln and intermediately thereof, as well as rollers 4 situated between the rollers arranged medially of the kiln and the end bearing rollers thereof. Arranged around the rotary element 1 are the chambers 5 and 6 which are adapted to have water supplied to them in sufficient quantity to enable the element 1 to be buoyed by the water during its rotation. The chambers 5 and 6 are approximately water-tight but part of the water which is supplied thereto gains egress from the said chambers but may be re-fed thereto by means of a pump or other suitable appliance.

The rotary cooler 7 may also be supported on rollers 8 arranged at either end thereof and at intermediate positions depending on its length. Such cooler is also surrounded by chambers 9 and 10 to which water may be supplied. A sufficiency of water is fed to the chambers 9 and 10 to enable the rotary cooler 7 to be buoyed by the water during its rotation. The said cooler is disposed on a foundation which slopes from the feed end of the cooler to its discharge end.

In the particular construction of rotary kiln and cooler shown in the drawings the outer shell of the rotary elements 1 and 7 consists of reinforced concrete 11 having reinforcement sufficient to withstand stresses occasioned therein due to the heat transmitted thereto from the interior of the said elements. Inwardly of the reinforced concrete 11 timber boarding 12 (which may be redwood or similar material) is provided. The boarding is of sufficient thickness and width to suit the construction of the kiln. Backing the said timber boarding is a layer of steel sheets 13 which are preferably jointed with lap joints. The sheets 13 may be about 20 gauge. The layer of steel sheets 13 is faced with a layer of insulating material 14 which preferably consists of asbestos and is approximately two inches thick. A series of round steel rods 15 are placed longitudinally of the firebrick lining 16 and they are spaced apart and of sufficient number to extend around the said lining; these rods are preferably three-eighths of an inch in diameter and they are arranged in such manner that their inner surfaces in relation to the firebrick lining 16 will be distanced about three inches from the inner face of the timber boarding 12 and about one inch from the inner face of the asbestos layer 14. The free space between the face of the asbestos 14 and the rods 15 is filled in with cement grouting 29, the latter also surrounding the rods 15 and preserving them from deterioration through any moisture which may be contained in the asbestos. If required the rods 15 may be sustained by steel rods 37 disposed in and longitudinally of the reinforced concrete 11 and connected to the rods 15 by metal stirrups 38 of suitable type.

To enable the rotary elements 1 and 7 to be mounted on their supporting rollers, rings 17 are formed on the reinforced concrete shell 11. Cast iron annular rings 18 are mounted over the rings 17 and to the outer face of the rings 18 are secured steel tires 19. These steel tires form bearing surfaces for the elements 1 and 7 against the said supporting rollers. The elements 1 and 7 may be driven by any suitable means; in Fig. 3 of the drawings a worm and worm wheel are shown for driving the kiln. Power may be conveyed to the worm shaft and from thence to the rotary elements 1 and 7.

The water carrying chambers in which the elements 1 and 7 are rotated are preferably constructed of reinforced concrete which is moulded in sections. These sections are furnished with horizontal flanges 20 and also with vertical flanges 21 by means of which the sections may be bolted together. In each of the water carrying chambers 5 and 6 a water sump 22 is provided to permit access to the roller bearings 4 which are on the interior of the said chambers. The elements 1 and 7 extend through the water carrying chambers 5 and 6. At one end of the element 1 is the chimney stack 23 through which waste products of combustion are discharged to atmosphere. Arranged at the opposite end of the element 1 is a hood 24 constructed of reinforced concrete; such hood is mounted on wheels 55 and is adapted to be placed in position to cover the discharge end of the element 1 when necessary. The said hood is preferably provided with a water-jacket 56 which extends around same. One or more inspection holes 57 glazed with blue or other suitable glass and a door 58 may be fitted to the hood 24. Water may be fed to the water-jacket 56 from the chamber 6 through the flexible piping 59 and it may be returned from said jacket to the chamber 6 by means of the flexible piping 60.

At the points where the rotary elements 1 and 7 project from the water carrying chambers 5 and 6 and 9 and 10 respectively suitable joints which are partially water-tight are furnished. Part of the water contained in the said water carrying chambers passes through these joints to the outside of the chambers and may be collected if necessary and re-fed to the water carrying chambers by a pump 40 or other suitable means. At the ends of the latter chambers reinforced concrete pillars 25 are provided through which the elements 1 and 7 project. A hood 26 (Figs. 2 and 7) may be furnished at the discharge end of the element 1 to serve in directing any water which passes through the partially water-tight joint of the water carrying chamber 6 to a sump 39 from whence it may be returned to the said chamber by the pump 40, the latter being associated with the pipes 41 and 42 which respectively lead directly to the sump 39 and the chamber 6. The hood 26 encloses an annular space or chamber 26′ (Fig. 7) communicating with a passage 54 which communicates with the sump 39. To provide a semi-water-tight joint for the rear ends of the chambers 5 and 6 and 9 and 10 the annular rings 18 (Figure 6) may be grooved to receive a brass or steel or other suitable metal ring 27. A comparatively water-tight cover 28 constructed of canvas or rubber or a mixture of both or other suitable material is secured at one end to the pillars 25 and at the other end is held by coil springs 30 against the ring 27; the springs 30 are mounted on rods 31 which project from the outer face of the pillars 25. Water from the chamber 6 passes through the outlet 61 between the element 1 and the walls 25 into the chamber 62 formed by the cover 28 and passes from said chamber 62 through the limited space between the ring 27 and the outer end of the cover 28 into the annular space or chamber 26' enclosed by hood 26 from whence it passes into the passage 54 to the sump 39.

The semi-water-tight cover 28 may be constructed as shown in Figure 9. One of its ends may be secured by bolts 43 to the pillars 25 and its outer end may be connected by bolts 44 to the plate 45. Another plate 46 is attached to the plate 47 secured to the element 1. In the plates 45 and 46 are grooves to receive the steel rings 48 between which are coiled springs 49. Brackets 50 extend from the pillars 25 and their lower ends carry the bolts 51, such bolts passing through channel irons 52 between which and surrounding the bolts 57 are the coil springs 53. The springs 49 serve to keep the plates 45 and 46 in position in relation to the cover 28 and such springs together with the springs 53 permit of the automatic adjustment of the plates 45 and 46 in relation to the brackets 50 and the cover 28, when such adjustment is required owing to the expansion or contraction of the element 1. The object of the cover 28 is to lessen the flow of water from the chamber 6. Water passes through the passage 61 to the chamber 62 between the plates 45 and 46 past the cup washer 63 to the chamber 26 and from thence to the passage 54 to the sump 39. To keep the firebrick lining 16 in proper position in the elements 1 and 7 and also to protect the ends of the latter cast iron or steel guards 32 are placed over such ends. At the discharge ends of the kiln and cooler thrust rollers 33 are provided.

When the hood 24 is in open position from the element 1 clinker may be discharged therefrom into the chute 34 from whence it is fed to the cooler element 7. Man-holes 35 are furnished in the water carrying chambers of the rotary cooler. An annular air chamber 36 is located at the feed end of the element 7 with which is associated a fan (not shown) for supplying cold air to the element 7 and for withdrawing hot air from said chamber and delivering it to the rotary element 1. The kiln is preferably fired with coal dust though it may be fired with other suitable fuel.

Though the invention has been described with reference particularly to rotary kiln it is to be understood that the invention is equally applicable with suitable modifications to other rotary tubular machinery such as ball mills or ball and tube mills, rotary furnaces, and such like machinery which may be built of any suitable material.

What I claim as my invention and desire to secure by Letters Patent is:—

1. In a rotary kiln of the type described having one or more open ended rotatable elements provided with an outer shell of reinforced concrete, a layer of timber boarding backing said concrete, a layer of steel sheets backing said boarding, a layer of heat insulating material backing said sheets, cement grouting backing said insulating material, a firebrick lining, and metal reinforcements for the components of said elements, substantially as described.

2. In a rotary kiln of the type described, the construction in which the reinforced concrete shell has formed integrally therewith a plurality of reinforced concrete rings, metal sheaths mounted on said rings, and metal tires mounted on said sheaths adapted to contact with rigid roller bearings for the rotatable elements of said machinery.

3. In rotary tubular machinery of the type herein described, the combination with one or more rotatable elements of such machinery wherein materials are treated, of one or more comparatively water tight chambers within which said elements are free to rotate in water carried therein, and means for lessening the loss of water from at least one end of each of said chambers, said means comprising a ring member mounted on the exterior wall of said element adjacent the end of said chamber, and a cover of flexible material held securely to the end wall of said chamber and projecting therefrom and coacting at its outer end with the ring member whereby the leakage of water past the cover and ring member is less than the leakage past the end wall of the chamber.

4. In combination with the elements as claimed in claim 3, a water sump, a cover for the end of said chamber enclosing an annular space communicating with said sump, whereby leakage water passing through said ring member and cover into said space will collect in the sump, and means for reconducting said collected water from the sump to the chambers.

5. In combination with the elements as claimed in claim 3, a water sump, a cover for the end of said chamber enclosing an annular space communicating with said sump, whereby leakage water passing through said ring member and cover into said space will collect in the sump, means for reconducting said collected water from the sump to the chambers, and resilient means carried by said end wall to yieldably hold said outer end of the cover in close coaction with the ring member.

In testimony whereof I affix my signature.

EDWARD G. STONE.